United States Patent
Clerckx et al.

(10) Patent No.: US 9,391,730 B2
(45) Date of Patent: Jul. 12, 2016

(54) METHOD AND APPARATUS FOR INTERFERENCE ALIGNMENT IN A WIRELESS COMMUNICATION SYSTEM

(75) Inventors: Bruno Clerckx, Seoul (KR); Duck Dong Hwang, Yongin-si (KR); Chun Kin Au Yeung, San Diego, CA (US); David James Love, West Lafayette, IN (US); Tae Joon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 355 days.

(21) Appl. No.: 14/005,456

(22) PCT Filed: Mar. 19, 2012

(86) PCT No.: PCT/KR2012/001954
§ 371 (c)(1),
(2), (4) Date: Sep. 16, 2013

(87) PCT Pub. No.: WO2012/128522
PCT Pub. Date: Sep. 27, 2012

(65) Prior Publication Data
US 2014/0003274 A1    Jan. 2, 2014

Related U.S. Application Data

(60) Provisional application No. 61/454,103, filed on Mar. 18, 2011.

(51) Int. Cl.
*H04W 72/12* (2009.01)
*H04J 11/00* (2006.01)
(Continued)

(52) U.S. Cl.
CPC ............ *H04J 11/005* (2013.01); *H04B 7/0456* (2013.01); *H04B 7/0617* (2013.01);
(Continued)

(58) Field of Classification Search
CPC .... H04B 7/0452; H04B 7/0617; H04B 7/024; H04B 7/0417; H04B 7/0456
USPC ............................ 375/346, 148; 370/329, 252
See application file for complete search history.

(56) References Cited

U.S. PATENT DOCUMENTS 8,599,976 B2 * 12/2013 Gomadam ......... H04B 74/0413
375/299
2007/0223622 A1 * 9/2007 Bang .................... H04L 1/0668
375/299

(Continued)

FOREIGN PATENT DOCUMENTS

KR    10-2010-0112754 A    10/2010
KR          10-0986649 B1    10/2010

(Continued)

Primary Examiner — Charles C Jiang
Assistant Examiner — Will Lin
(74) Attorney, Agent, or Firm — Jefferson IP Law, LLP

(57) ABSTRACT

The present invention relates to a method and apparatus for interference alignment in a wireless communication system. A method in which a terminal aligns interferences in a wireless communication system, which includes a first base station governing a first cell and a second base station governing a second cell, comprises: a step in which the terminal measures a serving channel from the first base station which is a serving base station and an interference channel from the second base station; a step of transmitting null space information orthogonal to the interference channel to the first base station; a step of measuring channels from the first base station and the second base station to which an inference alignment plane generated based on the null space information is applied, and generating a receiving filter; and a step of transmitting, to the first base station, the interference alignment plane, the receiving filter, and effective channel measurement value based on the channel from the first base station.

9 Claims, 11 Drawing Sheets

(51) Int. Cl.
  *H04L 25/02* (2006.01)
  *H04L 25/03* (2006.01)
  *H04B 7/04* (2006.01)
  *H04B 7/06* (2006.01)
  *H04B 7/02* (2006.01)

(52) U.S. Cl.
  CPC ......... *H04J11/0033* (2013.01); *H04L 25/0204* (2013.01); *H04L 25/0244* (2013.01); *H04L 25/0398* (2013.01); *H04L 25/03955* (2013.01)

(56) References Cited

U.S. PATENT DOCUMENTS

| | | | | |
|---|---|---|---|---|
| 2008/0007454 A1* | 1/2008 | Minkoff | ............... | H01Q 3/2611 342/379 |
| 2009/0181708 A1* | 7/2009 | Kim | ............... | H04B 7/024 455/501 |
| 2009/0215480 A1* | 8/2009 | Kim | ............... | H04B 7/024 455/501 |
| 2009/0262719 A1* | 10/2009 | Shim | ............... | H04B 7/0452 370/342 |
| 2010/0080323 A1* | 4/2010 | Mueck | ............... | H04J 11/0033 375/296 |
| 2010/0254325 A1* | 10/2010 | Narasimhan | ........... | H04B 7/024 370/329 |
| 2011/0051837 A1 | 3/2011 | Park et al. | | |
| 2012/0046038 A1* | 2/2012 | Gao | ............... | H04W 28/16 455/447 |
| 2012/0163433 A1* | 6/2012 | Koike-Akino | ...... | H04W 28/048 375/220 |
| 2013/0279422 A1* | 10/2013 | Kim | ............... | H04B 7/024 370/328 |

FOREIGN PATENT DOCUMENTS

WO   2010-101345 A2   9/2010
WO   2010-123700 A1   10/2010

* cited by examiner

METHOD AND APPARATUS FOR INTERFERENCE ALIGNMENT IN A WIRELESS COMMUNICATION SYSTEM

TECHNICAL FIELD

The present disclosure relates to a wireless communication system and, in particular, to an interference alignment method and apparatus in uplink and downlink.

BACKGROUND ART

There have been many inventions in the field of the cellular communication systems and fourth generation communication technologies for in the last few years. The network MIMO systems referred to as multi-cell MIMO systems are focused on the IMT-Advanced and beyond systems. In such multi-cell MIMO networks, the inter-cell interference is one of the significant problems. In the well-designed multi-cell MIMO systems, the inter-cell coordination can be accomplished through cooperative signal configuration. There are many methods well-known for making in possible to reach certain interference channel capacity through efficient cooperative multi-cell processing design. One of the well-known methods is interference alignment.

The interference alignment is a cooperative processing of the transmitters/receivers. This is to generate overlapped signal spaces occupied by unwanted interferences at the respective receivers while maintain the wanted signal spaces. On the time or frequency varying channel, the interference alignment is capable of achieving symbol extension in time and frequency domain. In the present disclosure, the main focus is on the space rather than time and frequency. The spatial freedom degree is conceived along with constant channel coefficient.

The channel alignment for three users (K=3) interference channel having multiple antennas (M>1) is known to have the external and internal boundaries of freedom degree that are equal to each other. When the external and internal boundaries of the freedom degree match each other, it is regarded that the interference alignment has achieved the optimal freedom degree. However, it has not been known whether such a result can be extended to the case of normal number of users (K>3) and plural receive and transmit antennas. In the different networks such as X networks and cellular networks, the constant channel coefficient of the interference alignment for achieving the optimal freedom degree is not known yet.

DISCLOSURE OF INVENTION

Technical Problem

The present disclosure considers the interference alignment problem on the 2-cell cellular networks having constant channel coefficient. The present disclosure is directed to the realistic scenario having different numbers of transmit/receive antennas instead of the assumption of equal numbers of transmit/receive antennas as (in the invention of interference alignment for symbol extension). The two cells have the same structure (i.e. homogeneous network) and, in this structure, each cell includes K users having N antennas and one base station having M antennas. The present disclosure is directed to the scenario of M>N. The interference alignment of multiple access channels (MAC) is considered first and then, the MAC interference alignment is extended to Broadcast Channel (BC) interference alignment using the duality between the MAC and BC. The proposed interference alignment method is referred to as null space interference alignment. The cases in which the transmit antennas are correlated and networks are heterogeneous are considered briefly.

Solution to Problem

In accordance with an aspect of the present invention, an interference alignment method of a base station in a wireless communication system including a first base station managing a first and a second base station managing a second cell includes measuring, at the first base station, a channel of a serving base station and interference channel of neighbor base station from terminals located in the first and second cells, generating an interference alignment plane based on the measurement result, calculating a transmission precoder for the terminal located in the second cell, the transmission precoder preventing the terminal located in the second cell from being influenced by interference a channel from the first cell to which the interference alignment plane is applied, and transmitting the transmission precoder to the terminal located in the second cell.

In accordance with another aspect of the present invention, an interference alignment method of a terminal in a wireless communication system including a first base station managing a first and a second base station managing a second cell includes measuring, at the terminal, a serving channel from the first base station as a serving base station and an interference channel from the second base station, transmitting null space information orthogonal with the interference channel to the first base station, measuring the channels from the first and second base stations to which an interference alignment plane generated based on the null space information is applied and generating a reception filter, and transmitting the interference alignment plane, the reception filter, and valid channel measurement value based on the channel from the first base station to the first base station.

In accordance with an aspect of the present disclosure, a base station for aligning interference in a wireless communication system including a first base station managing a first and a second base station managing a second cell includes a transceiver which transmits and receives signals to and from neighbor base station or a terminal and a control unit which controls measuring, at the terminal, a serving channel from the first base station as a serving base station and an interference channel from the second base station, transmitting null space information orthogonal with the interference channel to the first base station, measuring the channels from the first and second base stations to which an interference alignment plane generated based on the null space information is applied and generating a reception filter, and transmitting the interference alignment plane, the reception filter, and valid channel measurement value based on the channel from the first base station to the first base station.

In accordance with another aspect of the present invention, a terminal for aligning interference in a wireless communication system including a first base station managing a first and a second base station managing a second cell includes a transceiver which transmits and receives signals to and from a serving base station or a neighbor base station and a control unit which controls measuring, at the first base station, a channel of a serving base station and interference channel of neighbor base station from terminals located in the first and second cells, generating an interference alignment plane based on the measurement result, calculating a transmission precoder for the terminal located in the second cell, the transmission precoder preventing the terminal located in the second cell from being influenced by interference a channel from the first cell to which the interference alignment plane is applied, and transmitting the transmission precoder to the terminal located in the second cell.

Advantageous Effects of Invention

According to the present disclosure, the base station and the terminal are capable of cancelling the interference from neighbor base stations and terminals efficiently in uplink and downlink.

MODE FOR THE INVENTION

1 Null Space Interference Alignment on 2-Cell MIMO MAC

The detailed description on the proposed method is mainly directed to the MAC scenario. The extension to the BC scenario may be understood from the duality of MAC and BC.

1.1 MAC Channel Model

Figure 1:
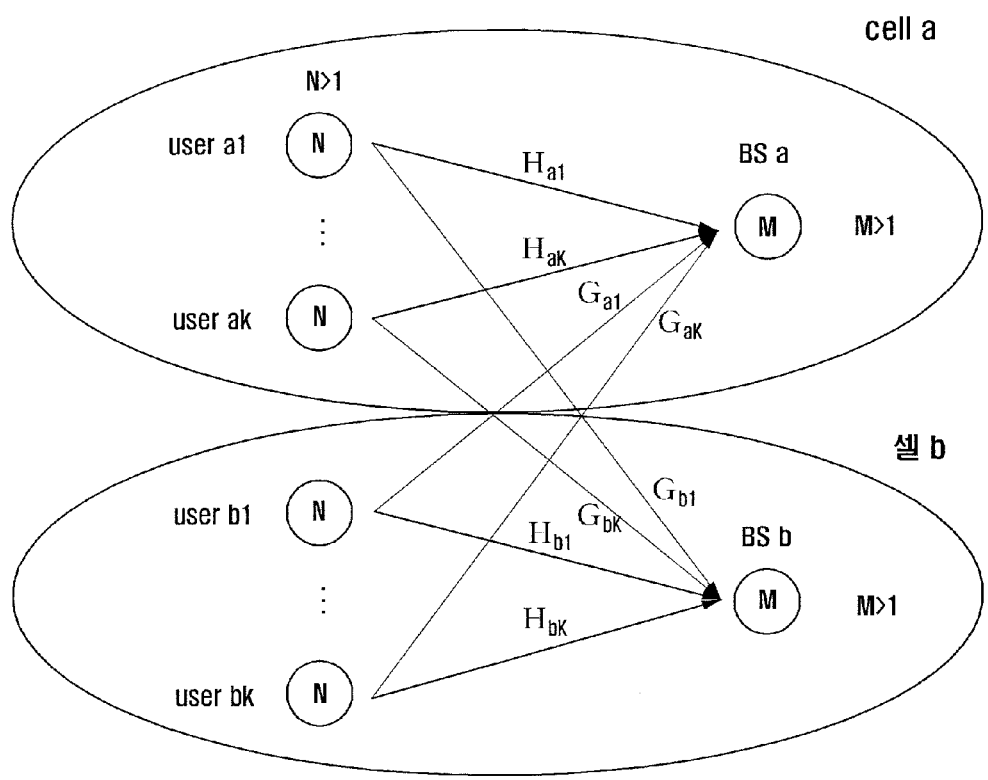
FIG. 1 is a diagram illustrating architecture of MAC (uplink) wireless network according to an embodiment of the present disclosure.

FIG. 1 is a diagram illustrating architecture of MAC (uplink) wireless network according to an embodiment of the present disclosure.

In the present disclosure, a structure of interference alignment mechanism for 2-cell K-user uplink MIMO is proposed. The network includes cell a and cell b. In each cell, the base station $\alpha(\alpha\epsilon\{a,b\})$ may receive K independent messages from K independent users within cell $\alpha$.

In the network, 2K users transmit signals to the base stations simultaneously. While the base station $\alpha$ listen to K users within cell $\alpha$, other K users within cell $\bar{\alpha}$ incur interference to the base station $\alpha$ (see FIG. 1). Here, $\bar{\alpha}=\{a,b\}/\alpha$. Then, the channel can be expressed as follows.

$$Y_\alpha = \sum_{m=1}^{K} H_{\alpha m} x_{\alpha m} + \sum_{m=1}^{K} G_{\alpha m} x_{\bar{\alpha} m} + Z_\alpha \qquad (1)$$

In equation (1), $Y_\alpha \epsilon C^{M\times 1}$ and $Z_\alpha \epsilon C^{M\times 1}$ denote the received signal and noise vectors respectively. The noise vector $Z^\alpha$ is generated such that each entry is characterized by zero mean and unit variance complex Gaussian distribution, i.e. independently and identically distributed (i.i.d.). The vectors $x_{\alpha m} \epsilon C^{N\times 1}$ and $x_{\bar{\alpha} m} \epsilon C^{N\times 1}$ are the transmission vectors related to each base station $\alpha$ and user m within the base station $\bar{\alpha}$. The matrix $H_{\alpha m} \epsilon C^{M\times N}$ denotes the channel from the user m within the cell $\alpha$ to the base station $\alpha$, $G_{\alpha m} \epsilon C^{M\times N}$ denotes an interference channel from user m within the cell $\bar{\alpha}$ to the base station $\alpha$. The entry of each of $H_{\alpha m}$ and $G_{\alpha m}$ is CN(0,1) and i.i.d. and all channel matrixes are independent. The transmission vector $x_{\alpha m}$ is as follows.

$$x_{\alpha m} = W_{\alpha m} s_{\alpha m} \qquad (2)$$

In equation (2), $s_{\alpha m} \epsilon C^{\beta \times 1}$ is the symbol carrying message $W_{\alpha m}$, $W_{\alpha m} \epsilon C^{N\times \beta}$ is the beamforming vector for transmitting the symbol $s_{\alpha m}$ for $\beta > 0$. At each transmitter, the average power $\rho$ is restricted to $E[\|x_{\alpha m}\|^2] \leq \rho$ as an example.

1.2 Null Spatial Interference Alignment Framework

In the present disclosure, a transmission and reception method for aligning K independent interferences from the interference cells completely on the low dimensional space ($<\max(M,N)$) is proposed in order for the zero-forcing-based signaling to null out all the interference completely. In the legacy interference alignment method for cellular networks, it is known that the per-cell freedom degree is K and each user secures one interference free signal dimension under the assumption of M=N=K+1.

The present disclosure considers the case of M>N for handling realistic scenario on the cellular networks (where the base station has the antennas greater in number than the user), and this method takes notice of transmitting plural streams of $\beta > 0$ (not limited to one data stream transmission). According to this configuration, the conditions for interference alignment are characterized. The conditions for the number of antennas that are required to solve $\mathcal{K}\beta$ signal dimension are conceived. In order to build an achievable method, the null space interference alignment concept is used. The null space interference alignment requires base stations using the null space planes selected to reflect the reception signal. In order to mitigate the out-of-cell freedom degree loss cooperatively, such a plane (or surface, hereinafter the terms 'surface' and 'plane' are used interchangeably) is designed such that the out-of-cell interferences are overlapped. The dimensions of the interference-free signals at the respective base station depend on the overlapped null space dimension so called geometric multiplicity with $\gamma > 0$ in this disclosure.

The 2-cell MAC interference alignment method consists of two steps, i.e. out-of-cell interference alignment and inter-user interference removal. The out-of-cell interference alignment is achieved by selecting a precoder $W_{\alpha m} \epsilon C^{N\times \beta}$ for projecting the received signal vectors to the interference alignment plane $P_\alpha$ and forcing null to the projected valid channel. If the out-of-cell interference alignment is performed, inter-user interference cancellation follows through channel inversion (or zero forcing). Detailed description are made of detailed conditions of out-of-cell interference alignment for $M=N_\gamma+\beta$ and $\mathcal{K}\beta \geq N \geq \beta$.

If M>N and if number of users of each cell is K, the out-of-cell interference alignment plan for cell $\alpha$ is defined as $P_\alpha \epsilon C^{\mathcal{K}\beta \times M}$, and a set of the user indices is defined as $\mathcal{K} = \{1, 2, \ldots K\}$. $P_\alpha$ is designed for rank$(P_\alpha G_{\alpha m}) < N-\beta$ in $\forall m \epsilon \mathcal{K}$. Since the homogeneous networks are assumed, the condition is as follows.

$$\dim(null(P_\alpha G_{\alpha m})) \geq \beta \text{ in } \forall m \epsilon \mathcal{K} \qquad (3)$$

Inequality (3) means that $P_\alpha$ is designed to distributed the available dimensions to nullify the out-of-cell interferences induced in $\{G_{\alpha m}\} m \epsilon \mathcal{K}$. If the condition of inequality (3) is fulfilled, each user of cell $\bar{\alpha}$ configures the zero-forcing transmission vector $W_{\bar{\alpha}m} \in C^{N \times \beta}$ to become $\text{span}(W_{\bar{\alpha}m}) \subset \text{null}(P_\alpha G_{\alpha m})$, i.e. equation (4).

$$P_\alpha G_{\alpha m} W_{\bar{\alpha}m} = 0 \text{ in } \forall m \in \mathcal{K} \quad (4)$$

In this way, the base station α guarantees cancellation of out-of-cell interference. As described above, the interest is focused on the realist case of multi-user cellular networks, i.e. $M = N\gamma + \beta$ and $\mathcal{K}\beta \geq N \geq \beta$. In this case, certain $P_\alpha \in C^{\mathcal{K}\beta \times M}$ has to fulfill the condition $\text{rank}(P_\alpha) = \mathcal{K}\beta$ in order for the base stations to decode $\mathcal{K}\beta$ streams.

In order to see the practicability of inequality (3), it is necessary to check the presence of the interference alignment plane $P_\alpha$ fulfilling inequality (3) and conceive detailed concept for designing $P_\alpha$. Then, null space interference alignment criteria for pairs different in numbers of transmit and receive antennas are characterized. For convenience sake, γ is defined.

Definition: In $A_i \in C^{M \times N}$ and $\text{Null}(A_i^*) = N_{Ai} \in C^{M \times (M-N)}$, the null spaces corresponding to a set of matrix $\{A_1, \ldots, A_K\}$ are referred to as $\{N_{A1}, \ldots, N_{AK}\}$. If the all γ-tuples of the null spaces $\{N_{Am_s}, \ldots, N_{Am_a}\}$ are non-empty intersection, i.e. if $\{\cap_{i=1}^a N_{Am_i}\} \neq \emptyset$ in $\forall m_i \in \mathcal{K}$, the set $\{A_1, \ldots, A_K\}$ is referred to as null spaces having geometric multiplicity γ.

The null space of $G_{\alpha m} \in C^{M \times N}$ is defined as $\text{Null}(G^*_{\alpha m}) = N_{\alpha m} \in C^{M \times (M-N)}$ in $\forall m \in \mathcal{K}$. Then the maximum geometric multiplicity γ of the set $\{G_{\alpha,1}, \ldots, G_{\alpha,K}\}$ can be characterized as follows.

Thesis 1: when $\{G_{\alpha 1}, \ldots, G_{\alpha K}\}$ under the conditions $G_{\alpha m} \in C^{M \times N}$ and $M > N$, the maximum geometric multiplicity γ is given by $$\gamma = \left\lceil \frac{M-N}{N} \right\rceil$$

for $$\left\{ \bigcap_{i=1}^{\gamma} N_{\alpha m_i} \right\} \neq \emptyset \text{ for } \forall m_i \in \mathcal{K}.$$

This means that the γ-tuple combinations (non-repetitive) of the null spaces $\{N_{\alpha m_s}, \ldots, N_{\alpha m_i}\}$ of $\{G_{\alpha,1}, \ldots, G_{\alpha,K}\}$ has non-empty intersection. The value of $$\gamma = \left\lceil \frac{M-N}{N} \right\rceil$$

denotes the maximum geometric multiplicity. If $M = N_\gamma + \beta$ and $\mathcal{K}\beta \geq N \geq \beta$, M and N fulfill $(\gamma-1)N < M - N \leq \gamma N$ always.

The null space interference alignment condition of inequity (3), i.e. $\dim(\text{null}(P_\alpha G_{\alpha m})) \geq \beta$ in $\forall m \in \mathcal{K}$ has the meaning as follows.

$$\dim(\text{ran}(N_{\alpha m}) \cap \text{ran}(P_\alpha^*)) \geq \beta \quad (5)$$

In order to fulfill the condition of inequity (5), at least β rows of $P_\alpha$ has to be $N_{\alpha m}$ in $\forall m \in \mathcal{K}$. It is assumed that the set $\{G_{\alpha,1}, \ldots, G_{\alpha,K}\}$ has null spaces of geometric multiplicity of γ≥1. Once $\{G_{\alpha,1}, \ldots, G_{\alpha,K}\}$ is fulfilled under γ≥1, $P_\alpha$ capable of inequity (5) (or inequity (3)) exists always.

The $k^{th}$ γ-tuple index set is defined as $\{\pi_i\}_k^{\gamma+k-1}$ having $\pi_i = ((i-1) \mod K) + 1$ in $k \in \mathcal{K}$. Then, the orthonormal basis of the intersection null space related to $\{\pi_i\}_k^{\gamma+k-1}$ is expressed as $N_\pi^{(k)} \in C^{N\gamma + \beta) \times \beta}$.

$$\text{span}(N_\alpha^{(k)}) \subset \left\{ \bigcap_{i=k}^{\gamma+k-1} N_{\alpha((i-1) \mod K)+1} \right\} \quad (6)$$

A simple method for configuring $P_\alpha$ fulfilling inequity (5) is to assign $(k-1)\beta + 1$ as β columns of $N_\alpha^{(k)}$ given in equation (7) to the $(\mathcal{K}\beta)^{th}$ row of $P_\alpha$.

$$P_\alpha = [N_\alpha^{(1)} N_\alpha^{(2)} \ldots N_\alpha^{(K)}]^* \quad (7)$$

Here, it is not unique to map the columns of $N_\alpha^{(k)}$ to the rows of $P^\alpha$. Any mapping from β column of $P_\alpha$ to β row of $P_\alpha$ is possible (the only problem is the expression). In this way, inequity (5) is fulfilled always.

The above-described configuration of $P_\alpha$ is based on the assumption in that $\{G_{\alpha,1}, \ldots, G_{\alpha,K}\}$, has γ≥1 and $M = N\gamma + \beta$. Since $P_\alpha$ has γβ. rows in the null space of $\{G_{\alpha,1}, \ldots, G_{\alpha,K}\}$, the out-of-cell interference channel $P_\alpha G_{\alpha,m}$ projected in $m \in \mathcal{K}$ has the non-zero rows of $(K-\gamma)\beta$. Accordingly, if equations (8) and (9) are as follows in 1≤γ≤K, inequity (5) is fulfilled.

$$N = (K-\gamma)\beta + \beta \quad (8)$$

$$M = N\gamma + \beta \text{ if } 1 \leq \gamma \leq K-1 \text{ and } M = N\gamma + K\beta \text{ if } \gamma = K. \quad (9)$$

Once $P_\alpha$ is designed, the inter-user interference is removed with matrix inversion. The matrix is defined as follows.

$$H_\alpha = [P_\alpha H_{\alpha 1} w_{\alpha 1} P_\alpha H_{\alpha 2} w_{\alpha 2} \ldots P_\alpha H_{\alpha K} w_{\alpha K}]$$

Also, the zero-forcing vector $v_{\alpha i}^*$ for user i is a set of normalized rows from $(i-1)\beta + 1$ to iβ of the matrix $H_\alpha^{-1}$ and selected by the base station α. The symbols from the user i of the cell α are decoded by multiplying $v_{\alpha i}^*$ to $P_\alpha Y_\alpha$.

1.3 Steps: MAC Interference Alignment (Uplink MAC Interference Alignment Method)

Descriptions are made of the detailed steps of the proposed interference alignment method. The network determines the geometric multiplicity γ first, and N and M are determined by equations (8) and (9). The index set is expressed as $\mathcal{K} = \{1, \ldots, K\}$.

Step 1: The base station α measures $H_{\alpha m}$ and $G_{\alpha m}$ for $\forall m \in \mathcal{K}$. The base station α maps the column β of $N_\alpha^{(m)}$ and $i^{th}$ row of $P_\alpha$ so as to form an interference alignment plane as shown in equation (7).

The interference plane $P_\alpha$ may be called the first step combiner of the receivers which may project the inter-cell interference signals in a specific subspace. The subspace is calculated prudently to null the out-of-cell interference while the intended signal within the serving cell is recovered completely.

Step 2: The base station α calculates the transmit precoder for the $m^{th}$ user of the cell a and feeds back the precoder weights to the users of the cell $\bar{\alpha}$ to achieve $w_{\bar{\alpha}m} \in \text{Null}(P_\alpha G_{\alpha m})$ for $\forall m \in \mathcal{K}$ (i.e. to be mapped to the null space of the equivalent (effective) channel with the application of the interference alignment plane to the interference channel=to avoid the interference from the equivalent channel with the application of the interference alignment plane to the interference channel).

This means to design the transmit precoder for the mobile terminals to achieve $P_\alpha G_{\alpha m} W_{\bar{\alpha}m} = 0$ (i.e. to null out interference channels from all users of cell $\bar{\alpha}$ at BS α==(mathematically) to null out the interference with the application of the interference plane at BS α when receiving the interference channel to which the transmit precoder of the respective interference users is applied. The cooperative design of the interference plane $P_\alpha$ and $W_{\alpha m}$ removes the inter-cell interference.

Step 3: The base station α generates the valid channel matrix $H_\alpha=[P_\alpha H_{\alpha 1}\ w_{\alpha 1} P_\alpha H_{\alpha 2} w_{\alpha 2}\ \ldots\ P_\alpha H_{\alpha K} w_{\alpha K}]$ and calculates a receive zero-forcing vector $v_{\alpha m}$ for decoding symbols from $m^{th}$ user of the cell α as the $m^{th}$ row of $H_\alpha^{-1}$.

The zero-forcing vector $v_{\alpha m}$ may be called the second step combiner performed after the interference plane $P_\alpha$. The aim is to null out intra-cell interference occurring by the co-scheduled users.

The proposed interference alignment method achieves the freedom degree $\mathcal{K}\beta$ per cell.

α indicates a or b. Accordingly, above-described operation is applicable to both the base stations a and b.

In detail, in case of the base station a,

Step 1: The base station a measure $H_{am}$ and $G_{am}$ for $\forall m\in\mathcal{K}$. The base station a maps the column β of $N_a^{(m)}$ to the $i^{th}$ row of $P_a$ to form the interference alignment plane as shown in equation (7)

Step 2: The base station a calculates the transmit precoder for $m^{th}$ user of cell b to achieve $w_{bm}\in\text{Null}(P_a G_{am})$ for $\forall m\in\mathcal{K}$ and feeds back the precoder weights to the users of cell b (to be mapped to the null space of the equivalent (effective) channel acquired by applying interference alignment plane to the interference channel ═to avoid the interference from the channel equivalent to the interference channel to which the interference alignment plane is applied.

Step 3: The base station a forms an effective channel matrix $H_a=[P_a H_{a1} w_{a1} P_a H_{a2}\ \ldots\ P_a H_{aK} w_{aK}]$ (BS a establish an equivalent channel for receiving the transmit signal to which the precoder weights received by the respective users of the cell a are applied) and calculates the receive zero-forcing vector $v_{am}$ for decoding the symbol from the $m^{th}$ user of the cell α as the $m^{th}$ row of $H_a^{-1}$.

The detail of the above procedure is described with reference to FIG. 2.

Figure 2:
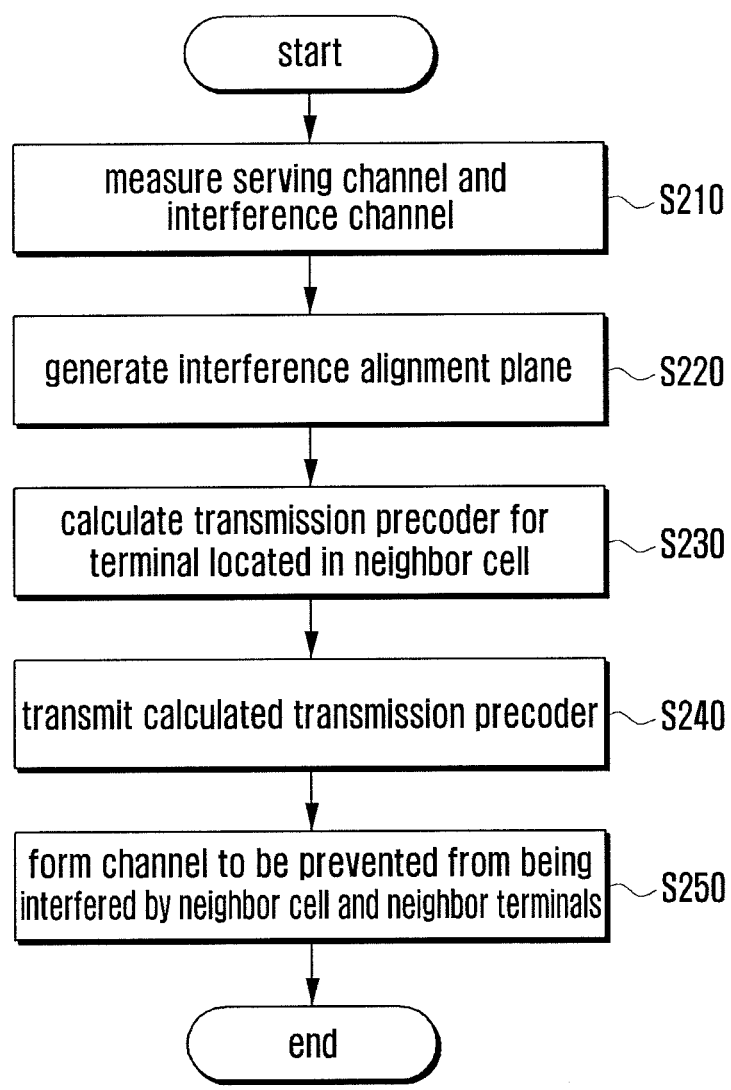
FIG. 2 is a flowchart illustrating the interference alignment procedure of the base station in uplink (MAC).

FIG. 2 is a flowchart illustrating the interference alignment procedure of the base station in uplink (MAC).

In more detail, the BS a measures its own channel and interference channels to all users located within the coverage of BS and BS b at step S210 (Step 1 above). Then, the BS a forms an interference alignment plane at step S220.

The BS a calculates the transmit precoder for the terminals belonging to the BS 2 at step S230 (Step 2 above). The transmit precoder is calculated in the way of preventing the terminals belonging to the BS b from being interfered by the BS a.

The BS a transmit the calculated precoder to the corresponding terminals at step S240.

The BS a forms a channel in the way that the terminals located within its cell are capable of removing interference from the neighbor cell, i.e. BS b at step S250 (step 3 above). The BS a calculates the receive zero-forcing vector value for decoding the symbol transmitted by a certain user.

Meanwhile, in case of base station b,

Step 1: The base station b measures $H_{bm}$ and $G_{bm}$ for $\forall m\in\mathcal{K}$. The base station b maps the column of β of $N_b^{(m)}$ to the $i^{th}$ row of $P_b$ as shown in equation (7) to form an interference alignment plane.

Step 2: The base station b calculates a transmit precoder for the $m^{th}$ user of cell a to achieve $w_{am}\in\text{Null}(P_b G_{bm})$ for $\forall m\in\mathcal{K}$ and feeds back the precoder weights to the users of the cell a.

Step 3: The base station b forms the valid channel matrix $H_b=[P_b H_{b1} w_{b1} P_b H_{b2} w_{b2}\ \ldots\ P_b H_{bK} w_{bK}]$ and calculates the receive zero-forcing vector $v_{bm}$ for decoding the symbol from the $m^{th}$ user of the cell b.

1.4 steps: BC Interference Alignment (Downlink Interference Alignment Method)

Figure 3:
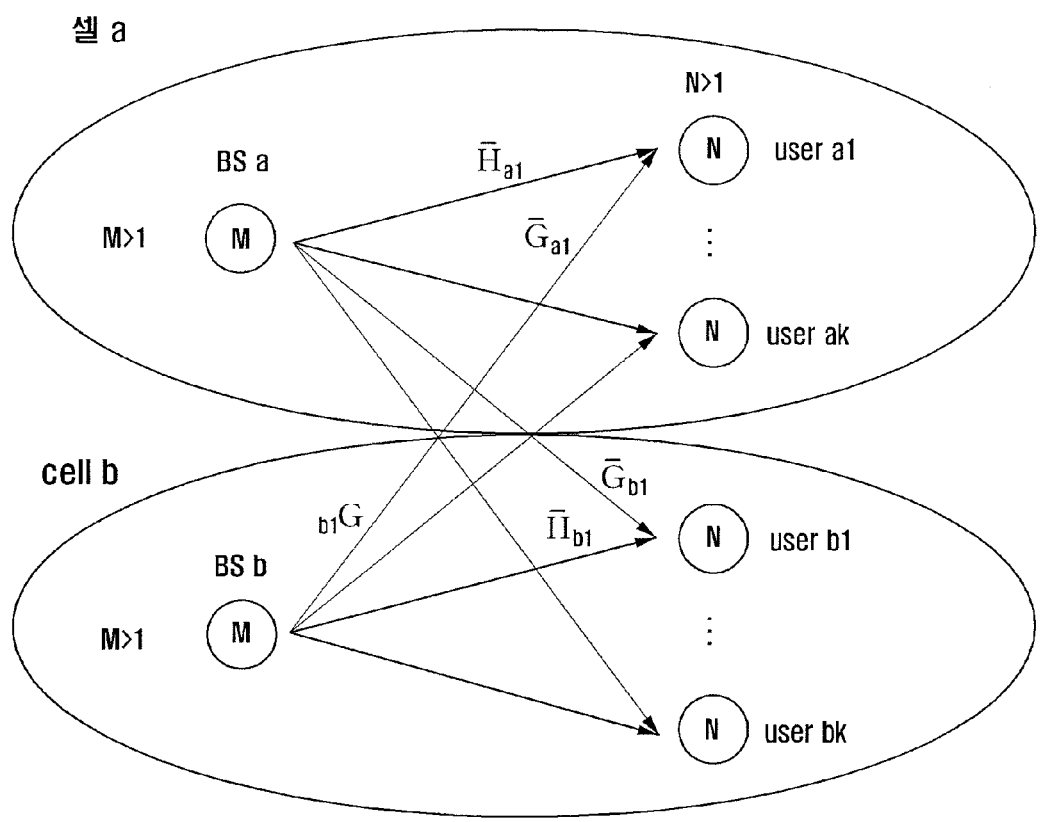
FIG. 3 is a diagram illustrating architecture of B (downlink) wireless network according to an embodiment of the present disclosure.

FIG. 3 is a diagram illustrating architecture of B (downlink) wireless network according to an embodiment of the present disclosure.

Using the duality of MAC and BC, the interference alignment method for BC to achieve the same freedom degree as MAC is described. Suppose that γ is given and M and N are determined as in the case of MAC. According to the duality, the downlink channels have the reciprocal relation with the uplink channels. That is, when $\overline{H}_{\alpha m}\in C^{N\times M}$ and $\overline{G}_{\alpha m}\in C^{N\times M}$, $\overline{H}_{\alpha m}=H_{\alpha m}^T$ and $\overline{G}_{\alpha m}=G_{\alpha m}^T$ come into existence.

Step 1: The user αm measures $\overline{H}_{\alpha m}$ and $\overline{G}_{\alpha m}$. The user αm feeds back $\text{Null}(\overline{G}_{\alpha m})=\overline{N}_{\alpha m}$ to the base station α.

The feedback information may be quantized or non-quantized.

Step 2: The base station α transmits $\overline{N}_{\alpha m}$ for $\forall m\in\mathcal{K}$ to the base station $\overline{\alpha}$ form the out-of-cell interference alignment plane $P_{\overline{\alpha}}$ by mapping the column β of $N_\alpha^{(m)}$ (γ-tuple intersection null space composed by $\{N_{\alpha m}\}_{m\in\mathcal{K}}$) to $P_{\overline{\alpha}}$.

Step 3: the user αm measures $\overline{H}_{\alpha m}P_\alpha$ and $\overline{G}_{\alpha m}P_\alpha$ (measures channels to which interference alignment plane is applied), renders $W_{\alpha m}^*\overline{G}_{\alpha m}P_{\overline{\alpha}}=0$ (null out interference when the user am receives the transmit signal to which the interference alignment plane applied at the interference cell base station), and forms received combination weight (reception filter) $W_{\alpha m}$ to achieve $W_{\alpha m}^*\overline{G}_{\alpha m}P_\alpha=0$.

$\overline{H}_{\alpha m}$ at step 1 and $\overline{H}_{\alpha m}$ at step 3 may be identical with or different from each other.

$\overline{H}_{\alpha m}P_\alpha$ and $\overline{G}_{\alpha m}P_\alpha$ may be measured based on the user-specific precoded reference signals or common non-precoded reference signals.

In the case of using the user-specific precoded reference signals, the user αm measures $\overline{H}_{\alpha m}P_\alpha$ and $\overline{G}_{\alpha m}P_{\overline{\alpha}}$ directly. At this time, the user-specific precoded reference signals transmitted by the base station α are precoded by $P_\alpha$, and the user-specific precoded reference signals transmitted by the base station $\overline{\alpha}$ are precoded by $P_\alpha$.

In the case of using the non-precoded reference signals, the user αm measures $\overline{H}_{\alpha m}$ based on the common non-precoded reference signals transmitted by the base station α, and the base station $\overline{\alpha}$ measures $\overline{G}_{\alpha m}$ based on the common non-precoded reference signals transmitted by the base station $\overline{\alpha}$. The base station α informs the user αm of the $P_{\overline{\alpha}}$ in DL. Alternatively, the base station $\overline{\alpha}$ may share $P_{\overline{\alpha}}$ with the base station α. Then the base station α informs the user αm of $P_{\overline{\alpha}}$ in DL. The DL indication of $P_\alpha$ and $P_\alpha$ may be implemented in quantized or non-quantized method.

Step 4: The user αm feeds back $w_{\alpha m}^*\overline{H}_{\alpha m}P_\alpha$ (equivalent channel received through the reception filter as the transmit signal to which the base station α has applied the interference alignment plane) to the base station α.

The feedback information may be quantized or non-quantized.

Step 5: The base station α forms $H_\alpha=[W_{\alpha 1}^*\overline{H}_{\alpha 1}P_\alpha;\ \ldots;\ W_{\alpha K}^*\overline{H}_{\alpha K}P_\alpha]$ and calculates the zero-forcing transmission weight $V_{\alpha m}$ for the user as the $m^{th}$ column of $\overline{H}_\alpha^{-1}$ (by combining the equivalent channels fed back from the respective users, the base station a designs the transmit filter. The zero-forcing transmit filter may be an example of the transmit filter.

The above procedure is described in detail with reference to FIG. 4.

Figure 4:
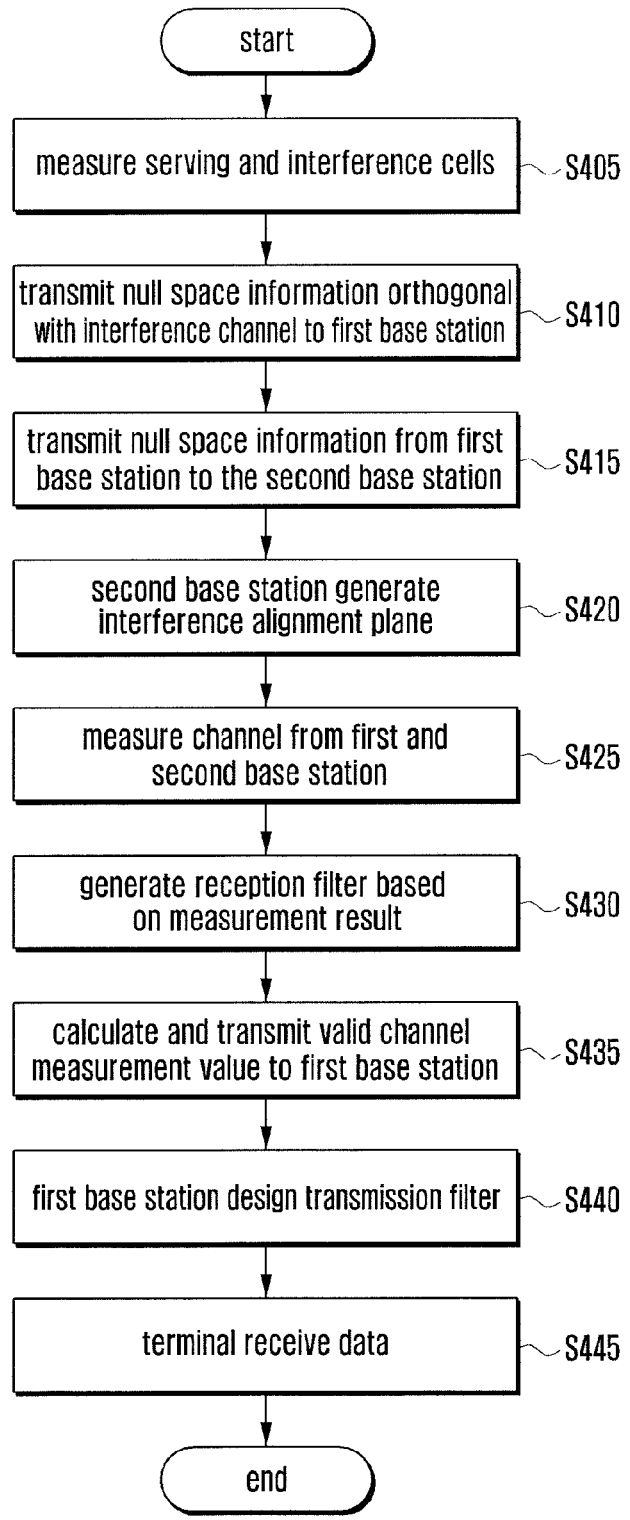
FIG. 4 is a flowchart illustrating the interference alignment procedure of the base station in downlink (MAC).

FIG. 4 is a flowchart illustrating the interference alignment procedure of the base station in downlink (MAC).

The first terminal measures the channel from the first base station serving the first terminal and interference channel from other cells (i.e. interference cells) at step S405 (step 1 above). Next, the first terminal transmits the channel information from the interference cell, i.e. the null space information on the channel of the interference cell, to the first base station, at step S410. The null space information is orthogonal with the measured interference channel.

Then the first base station transmits the null space information to the second base station as the interference base station at step S415. The second base station generates an interference alignment plane at step S420.

The terminal measures the channel from the first base station and the interference channel again using the signals precoded with the interference alignment plane and transmitted by the first and second base stations at step S425.

The terminal generates a reception filter based on the measurement result at step S430. The reception filter is characterized by removing the interference when the interference signal to which interference alignment plane is applied in the interference cell is received through the interference channel.

The terminal transmits the interference alignment plane, channel, and valid channel measurement value in consideration of the reception filter of the terminal from the first base station at step S435 (step 4 above).

The first base station receives the valid channel feedback from the terminal to design the transmission filter at step S440 (step 5 above) and transmits data to the terminal at step S445.

$\alpha$ indicates a or b. Accordingly, the above described operation is applicable to both the base stations a and b.

In detail, in the case of the base station a,

Step 1: The user am measures $\overline{H}_{am}$ and $\overline{G}_{am}$. The user am feeds back $\text{Null}(\overline{G}_{am}) = \overline{N}_{am}$ to the base station a.

The feedback information may be quantized or non-quantized.

Step 2: The base station a transmits for $\overline{N}_{am}$ to the $\forall m \in \mathcal{K}$ to the base station be to form the out-of-cell interference alignment plane $P_b$ $\forall m \in \mathcal{K}$ by mapping the column $\beta$ of $N_\alpha^{(m)}$ ($\gamma$-tuple intersection null space formed by $\{\overline{N}_{am}\} m \in \mathcal{K}$) to $P_b$.

Step 3: The user am measures $\overline{H}_{am} P_a$ and $\overline{G}_{am} P_b$ and forms a reception combination weight (reception filter) to achieve $W_{am}^* \overline{G}_{am} P_b = 0$.

$\overline{H}_{am}$ of step 1 and $\overline{H}_{am}$ of step 3 may be identical with or different from each other.

The measurement of $\overline{H}_{am} P_a$ and $\overline{G}_{am} P_b$ may be performed based on the user-specific precoded reference signals or common non-precoded reference signals.

In the case of using the user-specific precoded reference signals, the user am measures $\overline{H}_{am} P_a$ and $\overline{G}_{am} P_b$ directly. At this time, the user-specific precoded reference signals transmitted by the base station a is precoded with $P_a$, and the user-specific precoded reference signals transmitted by the base station be are precoded with $P_b$.

In the case of using the common non-precoded reference signals, the user am measures $\overline{H}_{am}$ based on the common non-precoded reference signals transmitted by the base station a and $\overline{G}_{am}$ based on the common non-precoded reference signals transmitted by the base station b. The base station a informs the user am of $P_a$ in DL. The base station b informs the user am of $P_b$ in DL. Alternatively, the base station b may share $P_b$ with the base station a. Then the base station a may inform the user am of $P_b$ in DL. The indication of $P_a$ and $P_b$ may be performed through quantized or non-quantized method.

Step 4: The user am feeds back $W_{am}^* \overline{H}_{am} P_a$ to the base station a.

The feedback information may be quantized or non-quantized.

Step 5: The base station a forms $\overline{H}_a = [W_{a1}^* H_{a1} P_a; \ldots; W_{a\tilde{K}}^* H_{a\tilde{K}} P_a]$ and calculates zero-forcing transmission weight $V_{am}$ for the user am with $m^{th}$ column of $\overline{H}_a^{-1}$.

In detail, in the case of base station b,

Step 1: The user bm measures $\overline{H}_{bm}$ and $\overline{G}_{bm}$. The user bm feeds back $\text{Null}(\overline{G}_{bm}) = \overline{N}_{bm}$ to the base station b.

The feedback information may be quantized or non-quantized.

Step 2: The base station b transmits $\overline{N}_{bm}$ for $\forall m \in \mathcal{K}$ to the base station a to form the out-of-cell interference alignment plane $P_a$ by mapping the column $\beta$ of $N_b^{(m)}$ ($\gamma$-tuple intersection null space composed by $\{\overline{N}_{bm}\} m \in \mathcal{K}$) to $P_a$.

Step 3: The user bm measures $\overline{H}_{bm} P_b$ and $\overline{G}_{bm} P_a$ and forms reception combination weight (reception filter) $W_{bm}$ to achieve $W_{bm}^* \overline{G}_{bm} P_a = 0$.

$\overline{H}_{bm}$ of step 3 and $\overline{H}_{bm}$ of step 1 may be identical with or different from each other.

$\overline{H}_{bm} P_b$ and $\overline{G}_{bm} P_a$ may be measured based on the user-specific precoded reference signals or common non-precoded reference signals.

In the case of using the user-specific precoded reference signals, the user am measures $\overline{H}_{bm} P_b$ and $\overline{G}_{bm} P_a$ directly. At this time, the user-specific precoded reference signals transmitted by the base station b is precoded with $P_b$, and the user-specific precoded reference signals transmitted by the base station a is precoded with $P_a$.

In the case of using the common non-precoded reference signals, the user bm measures $\overline{H}_{bm}$ based on the common non-precoded reference signals transmitted by the base station b and $\overline{G}_{bm}$ based on the common non-precoded reference signals transmitted by the base station a. The base station a informs the user bm of $P_a$ in DL. Alternatively, the base station a may share $P_a$ with the base station b. Then the base station b informs the user bm of $P_a$ in DL. The DL indication of $P_b$ and $P_a$ may be performed through quantized or non-quantized method.

Step 4: The user bm feeds back $W_{bm}^* \overline{H}_{bm} P_b$ to the base station b.

The feedback information may be quantized or non-quantized.

Step 5: The base station b forms $\overline{H}_b = [W_{b1}^* \overline{H}_{b1} P_b; \ldots; W_{b\tilde{K}}^* \overline{H}_{b\tilde{K}} P_b]$ and calculates zero-forcing transmission weight $V_{bm}$ for the user bm with $_{the\ m}{}^{th}$ column of $\overline{H}_b^{-1}$.

Due to the duality of MAC and BC, the interference alignment proposed for BC achieves the freedom degree of $\mathcal{K}\beta$ per cell which fulfills $M \geq N$ for 2-cell homogeneous cellular networks. For BC, the proposed interference alignment method requires two CSI feedback (steps 1 and 4). Accordingly, the proposed method is appropriate for slow fading channels for which two forward-reverse link accesses is possible in the channel coherence time.

Hereinafter, a modified example characterized by large feedback overhead and frequent message exchange between the base stations in spite of the gain requiring a single feedback.

Step 1: The user $\alpha m$ measures $\overline{H}_{\alpha m}$ and $\overline{G}_{\alpha m}$. The user $\alpha m$ feeds back both $\overline{H}_{\alpha m}$ and $\overline{G}_{\alpha m}$ to the base station $\alpha$.

Step 2: The base station $\alpha m$ transmits the matrices for $\overline{G}_{\alpha m}$ for $\forall m \in \mathcal{K}$ to the base station $\overline{\alpha}$. The base station $\overline{\alpha}$ maps the column $\beta$ of $N_\alpha^{(m)}$ ($\gamma$-tuple intersection null space composed by $\{N_{\alpha m}\} m \in \mathcal{K}$) to $P_\alpha$ to form the out-of-cell interference alignment plane $P_\alpha$. In order to accomplish $W_{\alpha m}^* \overline{G}_{\alpha m} P_{\overline{\alpha}} = 0$, the base station $\alpha$ forms the reception combination weight (reception filter) $W_{\alpha m}$ for all the users $\alpha m$ based on $P_{\overline{\alpha}}$ and $\overline{G}_{\alpha m}$.

Step 3: The base station $\overline{\alpha}$ transmits $W_{\alpha m}$ for $\forall m \in \mathcal{K}$ to the base station $\alpha$. The base station $\alpha$ calculates $W_{\alpha m}^* \overline{H}_{\alpha m} P_\alpha$ based on $\overline{H}_{\alpha m}$ prior feedback performed at step 1.

Step 4: The base station α generates $\overline{H}_\alpha=[W_{\alpha1}^*\overline{H}_{\alpha1}P_\alpha;\ldots;W_{\alpha\tilde{K}}^*\overline{H}_{\alpha\tilde{K}}P_\alpha]$ and calculates zero-forcing transmission weight $V_{\alpha m}$ for the user αm as the $m^{th}$ column of $\overline{H}_\alpha^{-1}$. The base station α notifies the user αm of the reception combination weight $W_{\alpha m}$ in DL (in the quantized or non-quantized way).

α indicates a or b. Accordingly, the above described operation is applicable to both the base stations a and b.

In detail, in the case of the base station a,

Step 1: The user am measures $\overline{H}_{am}$ and $\overline{G}_{am}$. The user am feeds back both the $\overline{H}_{am}$ and $\overline{G}_{am}$ to the base station a.

Step 2: The base station a transmits the matrices $\overline{G}_{am}$ for $\forall m \in \mathcal{K}$ to the base station b. The base station b forms the out-of-cell interference alignment plane Ft by mapping the column β of $N_a^{(m)}$ γ-tuple intersection null space composed by to $\{\overline{N}_{am}\}m \in \mathcal{K}$) to $P_b$. In order to accomplish $W_{am}^*\overline{G}_{am}P_b=0$, the base station generates the reception combination weight (reception filter) $W_{am}$ for all the users am based on the known $P_b$ and $G_{am}$ Step 3: The base station b transmits $W_{am}$ for $\forall m \in \mathcal{K}$ to the base station a. The base station a calculates $W_{am}^*\overline{H}_{am}P_a$ based on the $\overline{H}_{am}$ prior feedback performed at step 1.

Step 4: The base station a forms $\overline{H}_a=[W_{a1}^*\overline{H}_{a1}P_a;\ldots;W_{a\tilde{K}}^*\overline{H}_{a\tilde{K}}P_a]$ and calculates zero-forcing transmission weight $V_{am}$ the user am as the $m^{th}$ column of $\overline{H}_a^{-1}$. The base station a notifies the user am of the reception combination weight $v_{am}$ in DL (in the quantized or non-quantized way).

In detail, in the case of the base station b,

Step 1: The user bm measures $\overline{H}_{am}$ and $\overline{G}_{am}$. The user bm feeds back both $\overline{H}_{am}$ and $\overline{G}_{am}$ to the base station b.

Step 2: The base station b transmits the matrices $\overline{G}_{bm}$ for $\forall m \in \mathcal{K}$ to the base station a. The base station a forms the out-of-cell interference alignment plane $P_a$ by mapping the column β of $N_b^{(m)}$ (γ-tuple intersection null space composed by $\{\overline{N}_{bm}\}m \in \mathcal{K}$) to $P_a$. In order to accomplish $W_{bm}^*\overline{G}_{bm}P_a=0$, the base station a generates the reception combination weight (reception filter) for all the users bm based on the known $P_a$ and $\overline{G}_{bm}$.

Step 3: The base station a transmits $W_{bm}$ for $\forall m \in \mathcal{K}$ to the base station b. The base station b calculates $W_{bm}^*\overline{H}_{bm}P_b$ based on the $\overline{H}_{bm}$ prior feedback performed at step 1.

Step 4: The base station b generates $\overline{H}_b=[W_{b1}^*\overline{H}_{b1}P_b;\ldots;W_{b\tilde{K}}^*\overline{H}_{b\tilde{K}}P_b]$ and calculates zero-forcing transmission weight $V_{bm}$ for the user bm as the mth column of $\tilde{H}_b^{-1}$. The base station b notifies the user bm in DL of the reception combination weight $w_{bm}$ (in quantized or non-quantized way).

2. Other Particulars 2.1 Degenerative Channel (Channel Correlation in View of Transmission)

In view of transmission, the antenna correlation exists often to degenerate channel state. There is a doubt on whether the channel degeneration degrades the interference alignment performance. An interesting scenario about BC (MAC is also handled in similar way) is considered. The channel correlation matrices in view of transmission from the serving and interference base stations are defined as $R_{am}=E[H_{am}^*H_{am}]$ and $S_{am}=E[G_{am}^*G_{am}]$ for rank($R_{am}$)=rank($S_{am}$)=r. Then the channels are modeled by $H_{am}=H_{am,w}R_{am}^{1/2}$ ⌐⌐ $G_{am}=G_{am,w}S_{am}^{1/2}$. Here, $H_{am,w}$ and $G_{am,w}$ are N×M zero averaging and unit variation complex Gaussian matrices i.i.d. If r≥N, it is identical with the null spatial interference alignment scenario described in the previous section, the interest is focused on the case fulfilling r<N herein. Since the channel correlation is a long term statistical data, it is assumed that the base station α knows $R_{am}$ for all users. In this case, since r<N, the user eliminates the out-of-cell interference always. Accordingly, β=N−r defined. In this scenario, the conventional zero-forcing transmission for $\mathcal{K}\boldsymbol{\beta}$=M is possible.

2.1.1 Steps.

It is noted that there is no need to configure the interference alignment in section 3.1.1 since the user always can null out the signals from other interference cells for r<N.

As described later, in 3.1.1, the operation of calculating the interference alignment plane is omitted as compared to the procedure described in section 2.3 and 2.4.

This is a special case, i.e. the case capable of being applied for r<N, and thus the description is directed to the case capable of achieving the same effect by omitting specific operation or process other than using the interference alignment method through the two-stage feedback scheme of the previous sections 2.3 and 2.4.

Step 1: The user αm measures $H_{αm}$ and $G_{αm}$ and calculates N×β zero-forcing reception vector $W_{αm}$ for $W_{αm}^*G_{αm}=0$ (since r<N, i.e. Null($G^*_{αm}$)=$W_{αm}$, it is always possible).

Step 2: The user αm feeds back $W_{αm}^*H_{αm}$ to the base station α.

This feedback information may be quantized or non-quantized. The quantized feedback may be performed by designing a codebook projected on $R_{αm}$.

Step 3: The base station α generates $\overline{H}_α=[W_{α1}^*H_{α1};\ldots;W_{αM}^*H_{αK}]$ and selects a transmit beamforming weight for the $m^{th}$ user from $\overline{H}_α^{-1}$.

α indicates a or b. Accordingly, the above described operation is applicable to both the base stations a and b.

In detail, in the case of the base station a,

Step 1: The user am measure $H_{am}$ and $G_{am}$ and calculates N×β zero-forcing reception vector for $W_{am}$ for $W_{am}^*G_{am}=0$ (since r<N, i.e. Null($G^*_{am}$)=$W_{am}$, it is possible always).

Step 2: The user am feeds back $W_{am}^*H_{am}$ to the base station a.

This feedback information may be quantized or non-quantized. The quantized feedback is performed by designing the codebook projected on $R_{am}$.

Step 3: The base station a generates the matrix $\overline{H}_a=[W_{a1}^*H_{a1};\ldots;W_{aM}^*H_{aK}]$ and selects transmission beamforming weight for the $m^{th}$ user from $\overline{H}_a^{-1}$.

In detail, in the case of base station b,

Step 1: The user bm measures $H_{bm}$ and $G_{bm}$ and calculates N×β zero-forcing reception vector $W_{bm}$ for $W_{bm}^*G_{bm}=0$ (since r<N, i.e. Null($G^*_{bm}$)=$W_{bm}$, it is possible always).

Step 2: The user bm feeds back $W_{bm}^*H_{bm}$ to the base station b.

This feedback information may be quantized or non-quantized.

The quantized feedback is performed by designing the codebook projected on $R_{bm}$.

Step 3: The base station b generates the matrix $\overline{H}_b=[W_{b1}^*H_{b1};\ldots;W_{bM}^*H_{bK}]$ and selects the transmission beamforming weight for the $m^{th}$ user from $\overline{H}_b^{-1}$.

When r≤N, the proposed interference alignment method achieve the freedom degree of $\mathcal{K}\boldsymbol{\beta}$ per cell. In case of BC, one time CSI feedback is enough and there is no need to design the out-of-cell interference alignment plane dependent on $G_{am}$. In the null spatial interference alignment method without channel correlation, the interference alignment plane aims to degenerate the valid channel ranks less than N for all the users. Actually, since the channel correlation matrices $R_{am}^{1/2}$ and $S_{am}^{1/2}$ responsible for a function similar to the null spatial interference alignment plane and the correlation matrices are independent among each other, the interference alignment for $\mathcal{K}\boldsymbol{\beta}$=M is done.

Here, an important aspect of the proposed interference alignment is addressed. Typically, a strong channel correlation from the base station's view point is a curse for multi-user MIMO. However, in view of the eligibility of the null spatial interference alignment for K users, the potential antenna correlation is a blessing.

This method is more appropriate for the highly-transmit correlated channel of the base station. This method may be applied to other types of transmission scenarios. Although the above method is applicable, its performance may be inferior to that of the method described in section 2.4.

2.2 Hybrid Method

In section 2.4, a description is made of the BC interference alignment requiring two-stage feedback. Section 3.1 shows the method simplified dramatically in the high transmit correlation at the base station. In the case of the hybrid method of this section, the base station switches between the methods of sections 2.4 and 3.1 according to the long term correlation matrix.

In the hybrid method, all users of the network measures their long term and/or broadband transmit matrices respectively based on channel measurements. Also, all the users report their long term and/or correlation matrices to the respective base stations in the quantized or non-quantized scheme. On the basis of cooperation through correlation matrices exchange, the base station determines the use of the method of section 2.4 or 3.1.

2.3 Interference Alignment in Heterogeneous Networks

Figure 5:
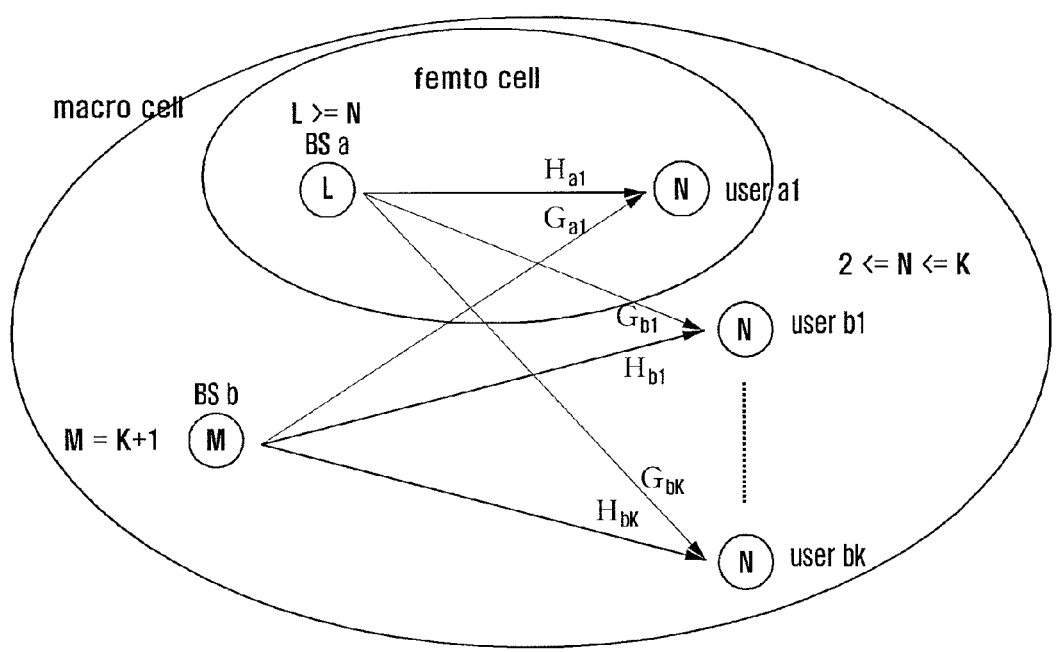
FIG. 5 is a diagram illustrating architecture of wireless communication network including macro and femto cells according to an embodiment of the present disclosure.

FIG. 5 is a diagram illustrating architecture of wireless communication network including macro and femto cells according to an embodiment of the present disclosure.

As a modification of the null spatial interference alignment method, the heterogeneous networks composed of the macro and femto (or pico) cells are considered. The femto cells are appropriate for use as low power and short range data access points and capable of providing improved coverage and throughput. The cross-tire interference between the macro and femto cells is the challenge for the deployment of the heterogeneous networks. In the femto cell, the signal user transmission is known as a scheme capable of providing superior coverage and spatial reuse related to the multi-user transmission. Accordingly, it is presumed that the signal user transmission gives array gain in the femto cell and the K multi-user transmissions gives multiplexing gain.

Each of the users of the network has N receive antennas ($2 \leq N \leq K$). If the number of transmit antennas of the femto cell base station (base station a) is $L(\geq N)$, the interference alignments of the femto and macro cells are expressed as $p_a \in C^{L \times 1}$ and $P_b \in C^{M \times K}$. The macro cell base station (base station b) has $M(=K+1)$ transmit antennas. Here, $\beta=1$ is assumed.

The interference alignment plane for the femto cell $p_a \in C^{L \times 1}$ may be designed randomly. This is because the user bm may configure $w_{bm}$ anytime under $2 \leq N \leq K$ to null out the interference from the femto cell base station 1 (i.e. $w_{bk}^* G_{bk} p_a = 0$). Accordingly, once $p_a$ is known to all of the users, the out-of-cell interference alignment for the macro cell is achieved without backhaul from the base station b to the base station a. In order to design the interference alignment plane $P_b \in C^{M \times K}$ for the macro cell, the first to $(K+1-N)^{th}$ columns has to span across Null $(G_{a1})$ In order to accomplish Span $(P_{b'}) \subset \text{Null}(G_{a1})$ the matrix having K+1-N columns is expressed as $P_{b'} \in C^{M \times (K+1-N)}$. Then the interference alignment plane $P_b$ for the macro cell may be designed as $P_b = [P_{b'} P_{b''}]$ for $P_{b''} \in C^{M \times (N-1)}$.

Step 1: The user a1 measures $H_{a1}$ and $G_{a1}$. The user a1 calculates $w_{a1}$ to achieve $w_{a1}^* G_{a1} P_b = 0$ and feeds back $P_{b'}$ to the base station a.

The user bk measures $H_{bk}$ and $G_{bk}$. The user bk calculates $w_{bk}$ to achieve $w_{bk}^* G_{bk} P_a = 0$ and feeds back $w_{bk}^* H_{bk}$ to the base station b.

Step 2: The base station a sends $P_{b'}$ to the base station b.

Step 3: The base station b configures $P_b = [P_{b'}, P_{b''}]$ and calculates zero-forcing transmission weight $v_{bk}$ for the user bk to achieve $v_{bk} \in \text{Null}(\{(w_{bi}^* H_{bi} P_b)^*\}_{i \in \{1_m K\}/k})$.

The proposed method may achieve the freedom degree of 1 for the femto cell users through one time CSI feedback and freedom degree per K cells for the macro cell users (state 2).

3 Base Station and Terminal Configurations

Figure 6:
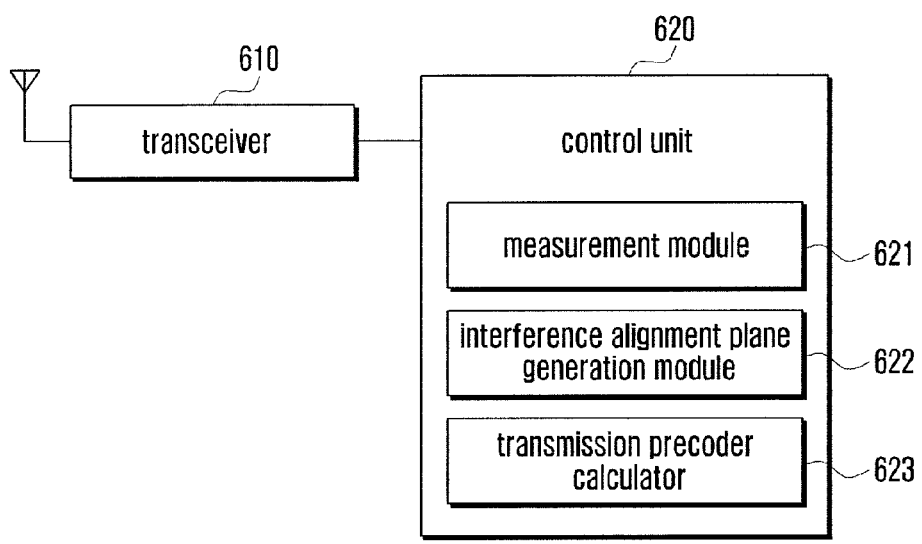
FIG. 6 is a block diagram illustrating a configuration of the base station according to an embodiment of the present disclosure.

FIG. 6 is a block diagram illustrating a configuration of the base station according to an embodiment of the present disclosure. As shown in FIG. 6, the mobile terminal of the present disclosure includes a transceiver 610 and a controller 620.

The transceiver transmits and receives data or signals to and from another terminal or adjacent base station.

The control unit 620 controls signal flows among the components of the base station for the operations of the base station. As shown in FIG. 6, the control unit 620 includes a measurement module, an interference alignment plane generator 622, and a transmission precoder calculation module 623.

The measurement module 621 measures the channel to the base station and the interference channels to the neighbor base station from the terminals located in the coverage of the serving and neighbor base stations.

The interference alignment plane generation module 622 generates the interference alignment plane based on the measurement result. In this case, the interference measurement plane is generated by mapping a specific column β of the null space matrix which is orthogonal with the interference channel to a specific row i of the interference alignment plane.

The transmission precoder calculation module 623 calculates the transmission precoder for the terminal located in the coverage of the neighbor base station in such a way of avoiding the interference from the channel acquired by applying the interference alignment plane the measured interference channel. The transmission precoder calculation module 623 transmits the calculated transmission precoder to the terminal located in the coverage of the neighbor cell.

Although the description is directed to the case where the control unit 620 includes independent blocks responsible for different functions, the present disclosure is not limited thereto. For example, the channel measurement operation may be performed by the control unit 620 in itself.

Figure 7:
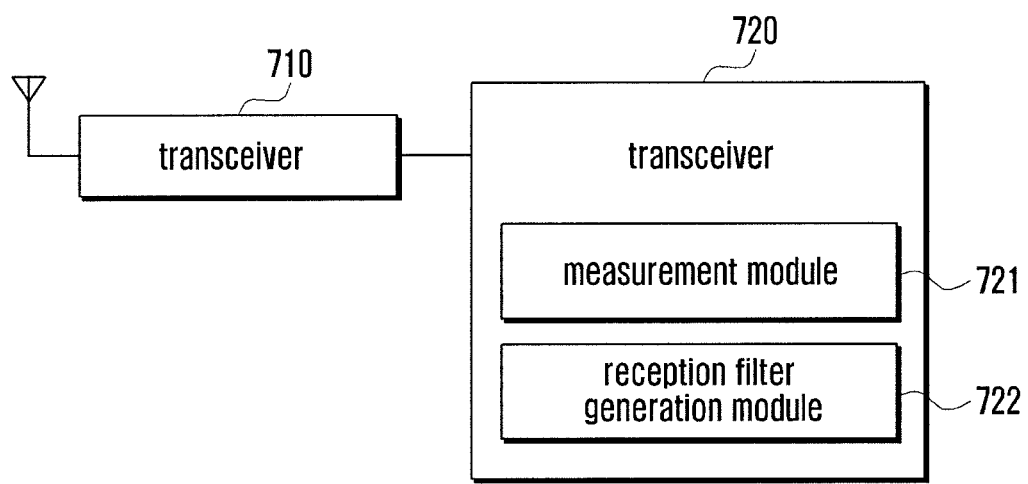
FIG. 7 is a block diagram illustrating a configuration of the terminal according to an embodiment of the present disclosure.

FIG. 7 is a block diagram illustrating a configuration of the terminal according to an embodiment of the present disclosure. As shown in FIG. 7, the terminal includes a transceiver 710 and a control unit 720.

The transceiver 710 transmits and receives data or signals to and from the serving or neighbor base station.

The control unit 720 controls signal flows among the function blocks for overall operations of the terminal. As shown in FIG. 7, the control unit 702 may include a measurement module 721 and a reception filter generation module.

The measurement module 721 measures the channel from the serving base station and the interference channels from neighbor base stations. The measurement module 721 also transmits the null space information orthogonal with the interference channel to the serving base station.

The null space information is transmitted from the serving base station to the neighbor base station.

The neighbor base station generates the interference alignment plane based on the null space information and shares the interference alignment plane with the serving base station.

Then the reception filter generation module 722 measures the channel from the serving and neighbor base stations to which the interference alignment plane has been applied. The reception filter is designed to remove the interference when the terminal receives the signal to which the interference alignment plane is applied by the neighbor base station.

The reception filter generation module 722 calculates a valid channel measurement value based on the interference alignment plane, reception filter, and channel received from the serving base station.

Then the serving base station design the transmission filter by combining equivalent valid channel measurement values received the respective terminals.

4 Simulation

Though this simulation, the validity of the null spatial interference alignment strategy proposed in the present disclosure is verified. The proposed interference alignment method requiring on time CSI feedback is simulated in the MAC, degenerated BC, and femto cell networks. In this simulation, it is assumed that the beamforming scenario attempts a single stream transmission per user without out-of-cell interference and inter-user interference.

Figure 8:
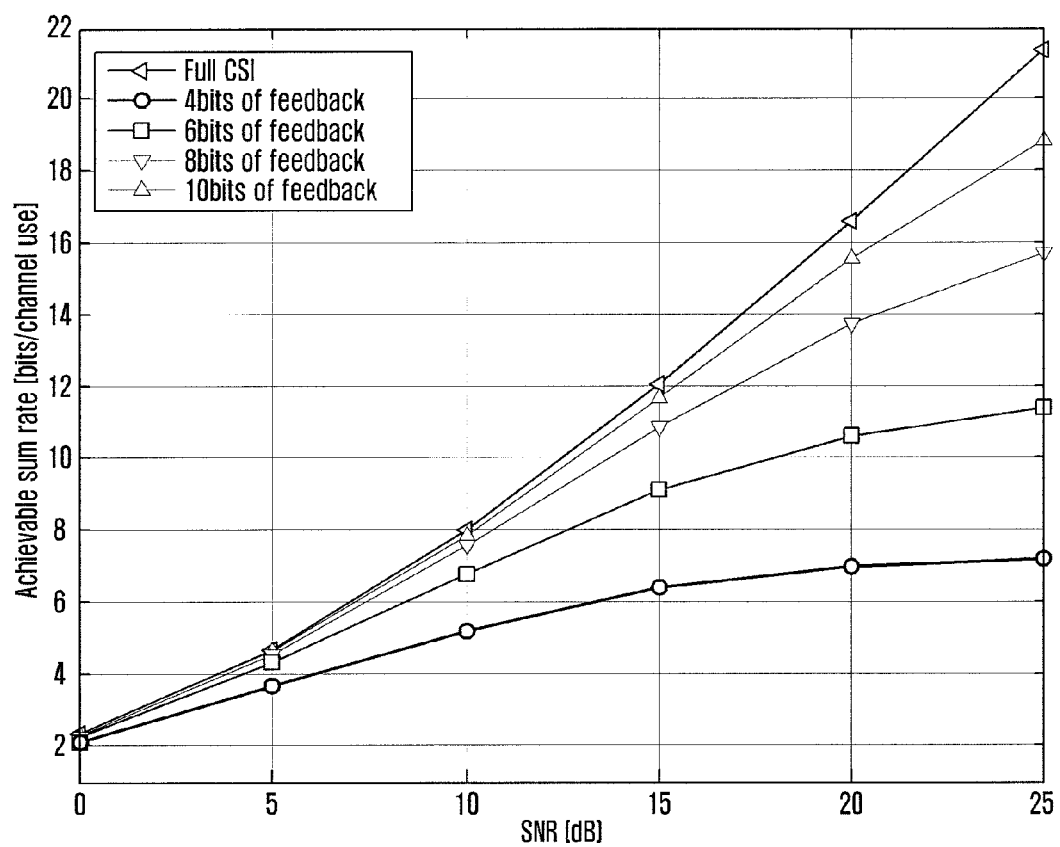
FIGS. 8 to 11 are graphs illustrating simulation results showing validity of the null spatial interference alignment method proposed in the present invention.

FIG. 8 shows the sum throughput for MAC with M=5, N=2, and K=3 (i.e. γ=2). The achievable per-cell freedom degree is K=3. According to the algorithm described in section 2.3, one time feedback of the quantized transmit beamformer for out-of-cell users of base station a to base station Ft is required. As the number of feedback bits, the sum rate approximates the complete CSI sum throughput.

Figure 9:
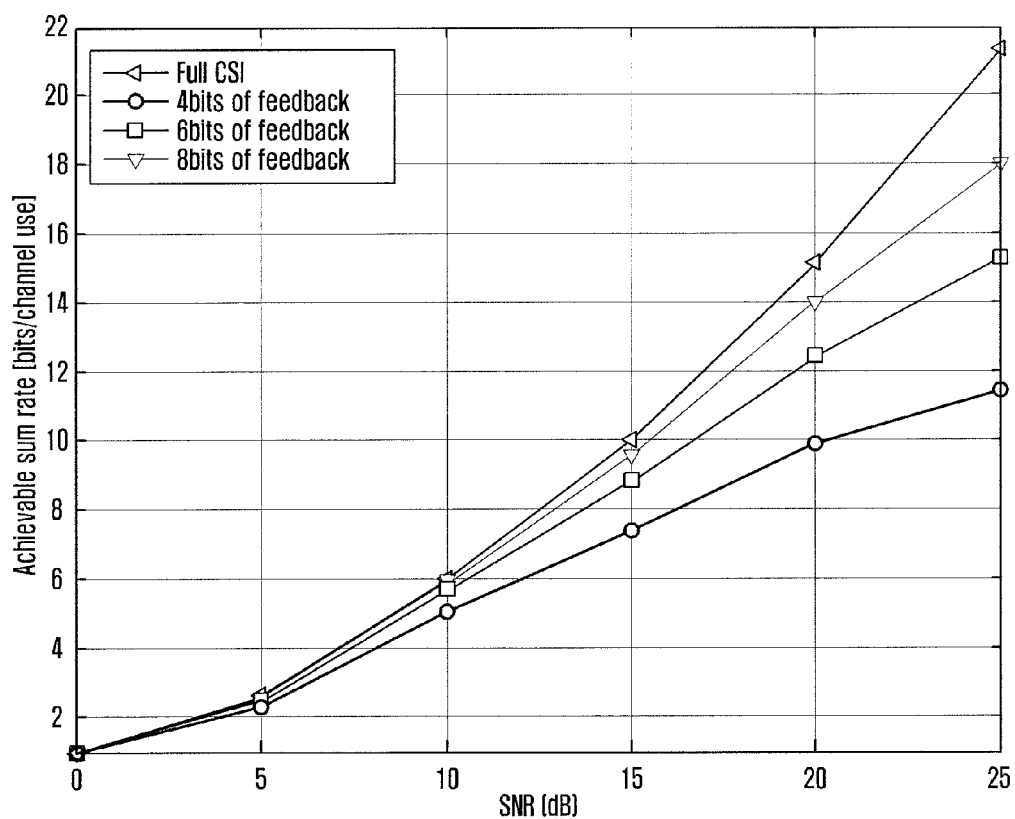

FIG. 9 shows the sum throughput on degenerated BC with M=4, N=3, and K=4. It is assumed that the correlation at the transmitter degenerate the channel rank which is less than N=3 (i.e. r=2<N). Since the correlation matrix acts as the interference alignment plane for the respective users on the degeneration BC, it is not necessary for the base station to design the interference measurement plane. As shown in the drawing, as the CSI resolution increases, the achievable sum throughput increases.

In the final simulation, the interference alignment in the femto cell BC networks with M=4, L=2, N=2, and K=2. In order to observe the interference limited behavior of the femto cell, it is assumed that the femto cell is located at a distance near the macro cell. That is, it is assumed the total power of the interference from the macro cell base station to the femto cell base station is greater than twice.

Figure 10:
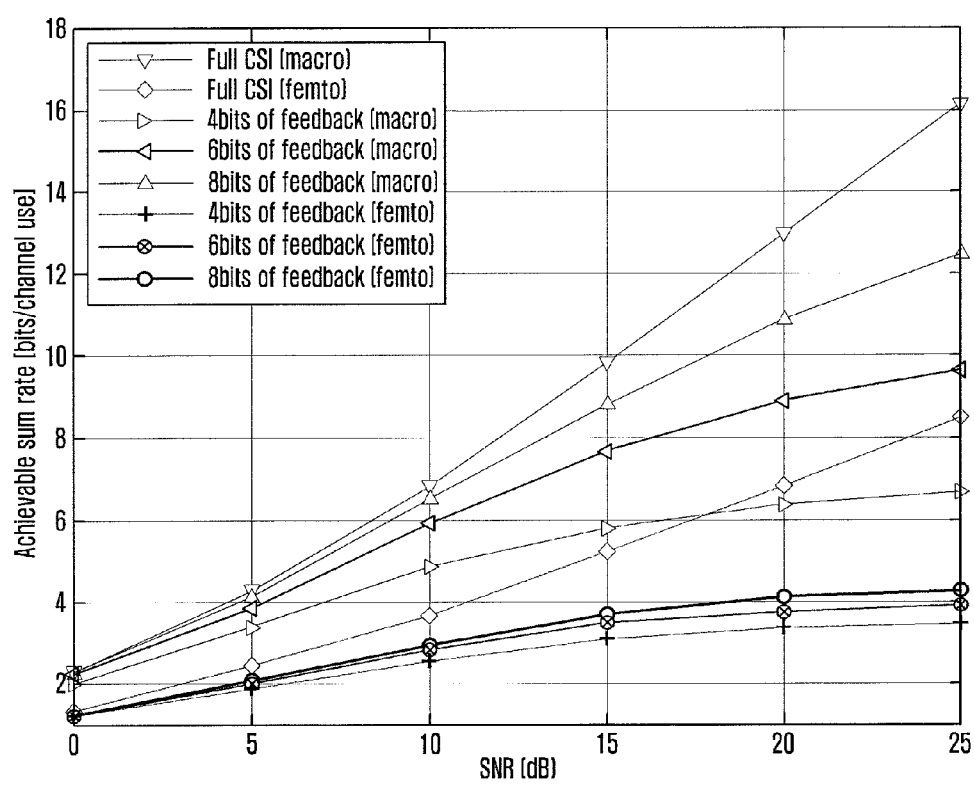

FIG. 10 shows the thumb throughput achievable for macro and femto cell users with the application of the interference alignment method according to an embodiment of the present invention. The achievable throughput for the femto cell user is limited due to the high interference limitation. In order to address the high cross-tier interference, a user scheduling may be considered for use in the femto cell to give additional throughput gain. In order to achieve potential gain in the femto cell, a user scheduling for the femto cell may be considered. The scheduler selects the user for which channel matches $p_a$ validly. That is, the user maximizing $\|H_{a1}p_a\|$ is selected.

Figure 11:
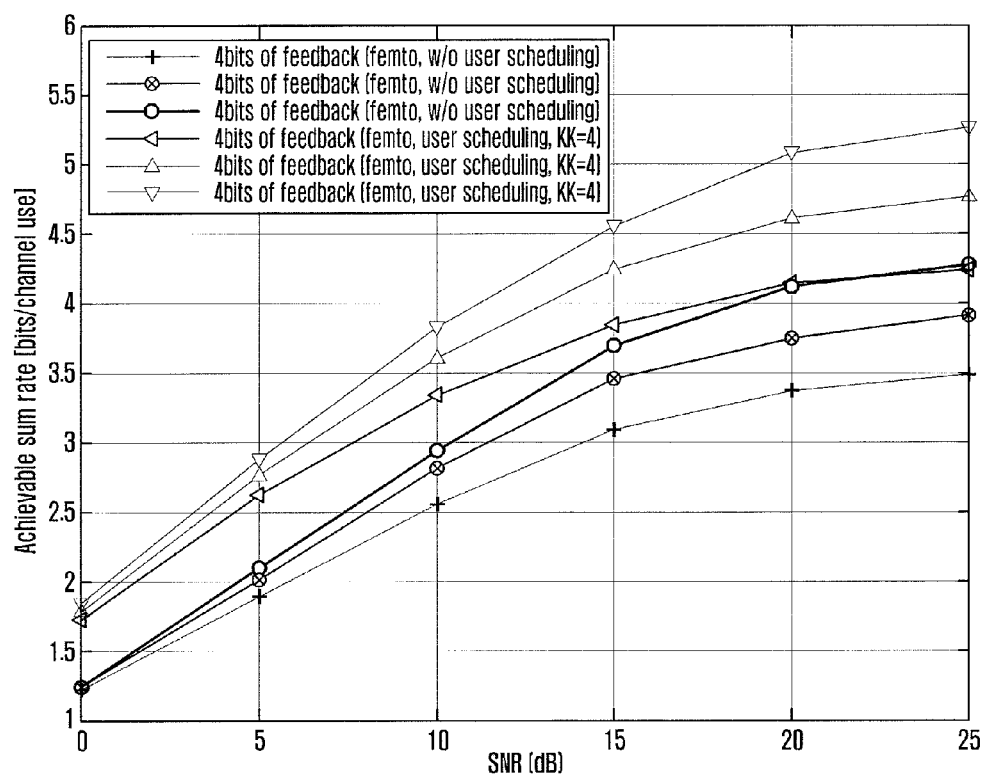

FIG. 11 shows throughput without user scheduling and the user scheduling throughput of user scheduling with KK=4 comparatively.

The invention claimed is:

1. An interference alignment method of a base station in a wireless communication system including a first base station managing a first cell and a second base station managing a second cell, the method comprising:

measuring, at the first base station, a channel of a serving base station and interference channel of neighbor base station from terminals located in the first and second cells;

generating an interference alignment plane based on a result of the measurement;

calculating a transmission precoder, based on the interference alignment plane, for the terminal located in the second cell, the transmission precoder preventing the terminal located in the second cell from being influenced by interference a channel from the first cell to which the interference alignment plane is applied; and transmitting the transmission precoder to the terminal located in the second cell, wherein the interference alignment plane is generated by mapping a predetermined column of a null space matrix orthogonal with the interference channel to a predetermined row of the interference alignment plane.

2. The method of claim 1, further comprising forming a channel to the terminals located in the first cell, the channel being designed for preventing the terminals located in the first cell from being influenced by the interference from the second cell.

3. An interference alignment method of a terminal in a wireless communication system including a first base station managing a first cell and a second base station managing a second cell, the method comprising:

measuring, at the terminal, a serving channel from the first base station as a serving base station and an interference channel from the second base station;

transmitting null space information orthogonal with the interference channel to the first base station;

measuring the channels from the first and second base stations to which an interference alignment plane generated based on the null space information is applied and generating a reception filter; and transmitting the interference alignment plane, the reception filter, and valid channel measurement value based on the channel from the first base station to the first base station, wherein the interference alignment plane is generated by mapping a predetermined column of a null space matrix orthogonal with the interference channel to a predetermined row of the interference alignment plane.

4. The method of claim 3, wherein the reception filter is configured to null out the interference when a signal to which the interference alignment plane is applied is received from the second base station as an interference base station.

5. The method of claim 3, further comprising receiving data transmitted by the first base station through a transmission filter, the transmission filter being generated by the first base station based on the valid channel measurement value.

6. The method of claim 5, further comprising forming a channel for the terminal located in the first cell to prevent the terminals located in the first cell from being influenced by the interference from the second cell.

7. A terminal for aligning interference in a wireless communication system including a first base station managing a first cell and a second base station managing a second cell, the terminal comprising:

a transceiver configured to transmit and receive signals to and from a serving base station or a neighbor base station; and a controller configured to control to:
   measure, at the terminal, a serving channel from the first base station as a serving base station and an interference channel from the second base station,
   transmit null space information orthogonal with the interference channel to the first base station,
   measure the channels from the first and second base stations to which an interference alignment plane generated based on the null space information is applied and generate a reception filter, and
   transmit the interference alignment plane, the reception filter, and valid channel measurement value based on the channel from the first base station, to the first base station, wherein the interference alignment plane is generated by mapping a predetermined column of a null space matrix orthogonal with the interference channel to a predetermined row of the interference alignment plane.

8. The terminal of claim 7, wherein the reception filter is configured to null out the interference when a signal to which the interference alignment plane is applied is received from the second base station as an interference base station.

9. The terminal of claim 7, wherein the controller is configured to control to receive data transmitted by the first base station through a transmission filter which is generated by the first base station based on the valid channel measurement value.

* * * * *